(12) United States Patent
Gruett et al.

(10) Patent No.: US 7,118,352 B2
(45) Date of Patent: Oct. 10, 2006

(54) HYDRAULIC METERING DEVICE

(75) Inventors: Donald G. Gruett, Manitowoc, WI (US); Michael J. Wech, Manitowoc, WI (US)

(73) Assignee: Oil-Rite Corporation, Manitowoc, WI (US)

(*) Notice: Subject to any disclaimer, the term of this patent is extended or adjusted under 35 U.S.C. 154(b) by 472 days.

(21) Appl. No.: 10/664,094

(22) Filed: Sep. 17, 2003

(65) Prior Publication Data

US 2005/0056320 A1   Mar. 17, 2005

(51) Int. Cl.
*F04B 17/00* (2006.01)
*F04B 53/12* (2006.01)

(52) U.S. Cl. .................. 417/225; 417/392; 417/552; 417/570

(58) Field of Classification Search ............. 137/538; 417/225, 392, 443, 511, 547, 552, 570
See application file for complete search history.

(56) References Cited

U.S. PATENT DOCUMENTS

| | | | |
|---|---|---|---|
| 600,841 A * | 3/1898 | Oderman ................. 417/570 |
| 603,242 A * | 4/1898 | Weatherhead ........... 417/392 |
| 990,616 A * | 4/1911 | Whitaker et al. ........ 417/570 |
| 1,108,984 A * | 9/1914 | Frey ...................... 417/225 |
| 2,175,881 A | 10/1939 | Davis |
| 2,351,930 A * | 6/1944 | Davis ..................... 417/225 |
| 2,392,030 A | 1/1946 | Davis |
| 2,457,339 A | 12/1948 | Bertea |
| 2,550,535 A * | 4/1951 | Davis ..................... 417/225 |
| 2,605,021 A | 7/1952 | Churchill et al. |
| 2,818,029 A | 12/1957 | Petzold |
| 2,931,313 A | 4/1960 | Hughes |
| 3,306,231 A | 2/1967 | Cadiou |
| 3,930,756 A | 1/1976 | Bruggeman |
| 4,062,424 A | 12/1977 | Lyden |
| 4,106,525 A | 8/1978 | Currie et al. |
| 4,436,494 A | 3/1984 | Yamaizumi |
| 4,577,728 A | 3/1986 | Gruett |
| 4,739,612 A * | 4/1988 | Stockbridge ............ 137/538 |
| 4,784,578 A | 11/1988 | Gruett |
| 4,784,584 A | 11/1988 | Gruett |
| 5,435,130 A * | 7/1995 | Kroiss et al. ............ 417/225 |

* cited by examiner

*Primary Examiner*—Michael Koczo, Jr.
(74) *Attorney, Agent, or Firm*—Ryan Kromholz & Manion, S.C.

(57) ABSTRACT

The metering device for a liquid medium comprises a cylinder and a piston operatively disposed therein to define a metering chamber ahead of the piston. The outlet end of the cylinder is open and closed by an evacuation valve. The piston is driven forwardly through a working stroke to force the liquid medium in the metering chamber out of the chamber and past the evacuation valve. A check valve located in the metering chamber moves from a closed to an open position on each working stroke to preclude entrapment of air in the metering chamber and thus provide for more accurate metering. The metering device may include means to regulate the length of the working stroke.

6 Claims, 9 Drawing Sheets

HYDRAULIC METERING DEVICE

BACKGROUND OF THE INVENTION

This invention relates to a metering device for the precision feeding of a liquid medium, even in relatively small or minute quantities.

Oil lubricants are among the many liquids that are at times metered. In a given instance, the feeding of too little oil may place a machine at risk. However, too much oil may contaminate a product and contribute to pollution. Thus, accuracy in metering can be very important.

While accuracy in metering is generally desired, it is often difficult to attain. Air often gets into a feeding or metering system and becomes entrapped in the metering chamber. The entrapped air in the metering chamber will displace liquid medium in the measured quantity to render metering in minute quantities virtually impossible and in larger quantities inaccurate. It is generally an object of this invention to provide a metering device for a liquid medium wherein entrapment of air in the metering chamber is generally precluded to provide for more accurate metering even in minute quantities.

SUMMARY OF THE INVENTION

The invention resides in a metering device for a liquid medium and which comprises a housing having an inlet and an outlet for the liquid medium. A cylinder is disposed in the housing and has an open end that communicates with the housing outlet. Check valve means are provided in the housing and are biased to close the open end of the cylinder. A piston is operatively disposed in the cylinder and forms therewith a metering chamber ahead of the piston. Means are provided to conduct the liquid medium from the inlet to the metering chamber. Means are further provided to drive the piston forwardly through a working stroke to force the liquid medium in the metering chamber out of the chamber and past the check valve means toward the housing outlet. The piston breaks the plane of the open end of the cylinder on each working stroke to generally preclude entrapment of air in the metering chamber and thus provide for more accurate metering of the liquid medium, even in minute quantities.

The present invention comprises an improvement of the metering devices as described and claimed in U.S. Pat. Nos. 4,784,578 and 4,784,584, incorporated herein by reference.

DESCRIPTION OF THE PREFERRED EMBODIMENT

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

Figure 1:
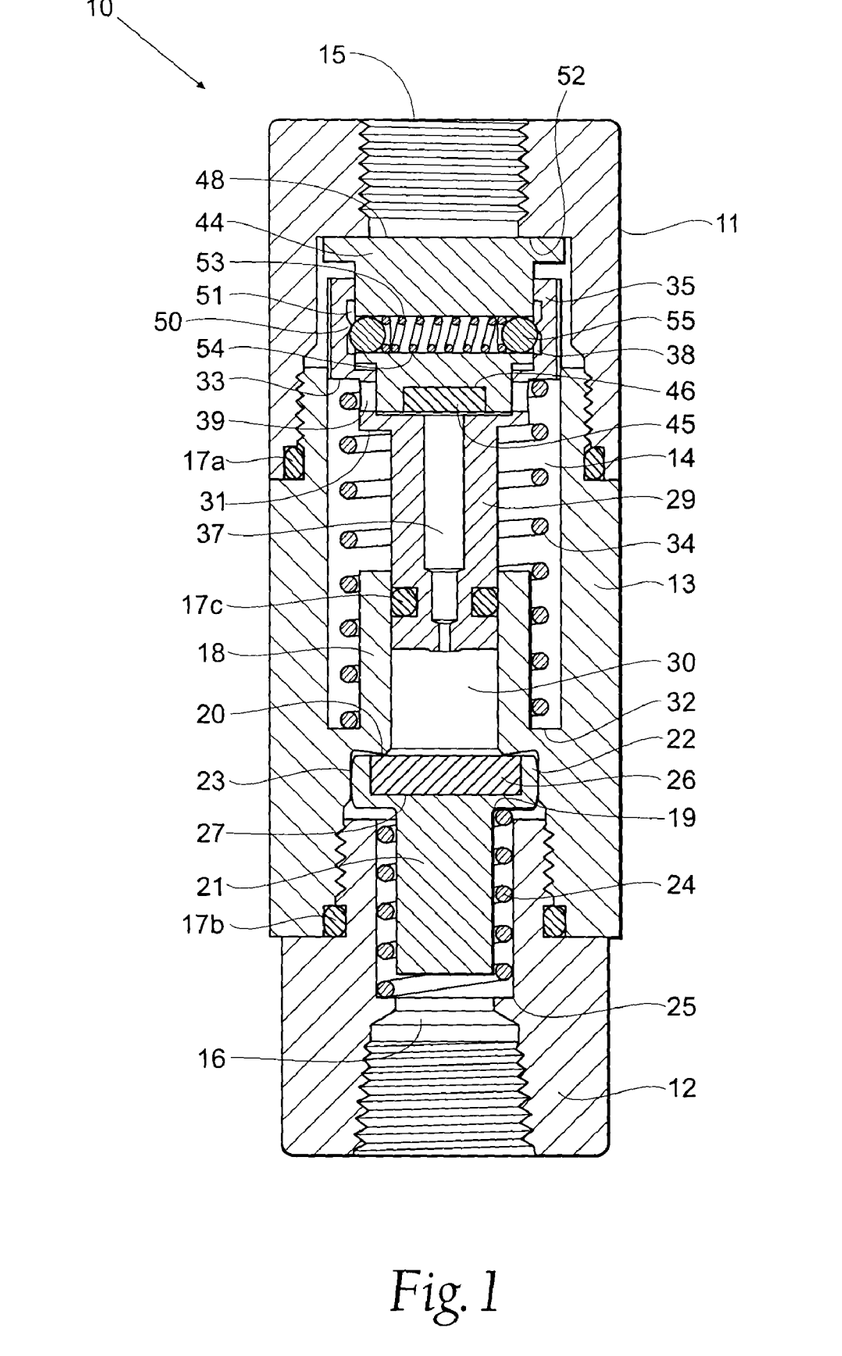
FIG. 1 is a cut-away side view of a first embodiment of the present invention.
Figure 2:
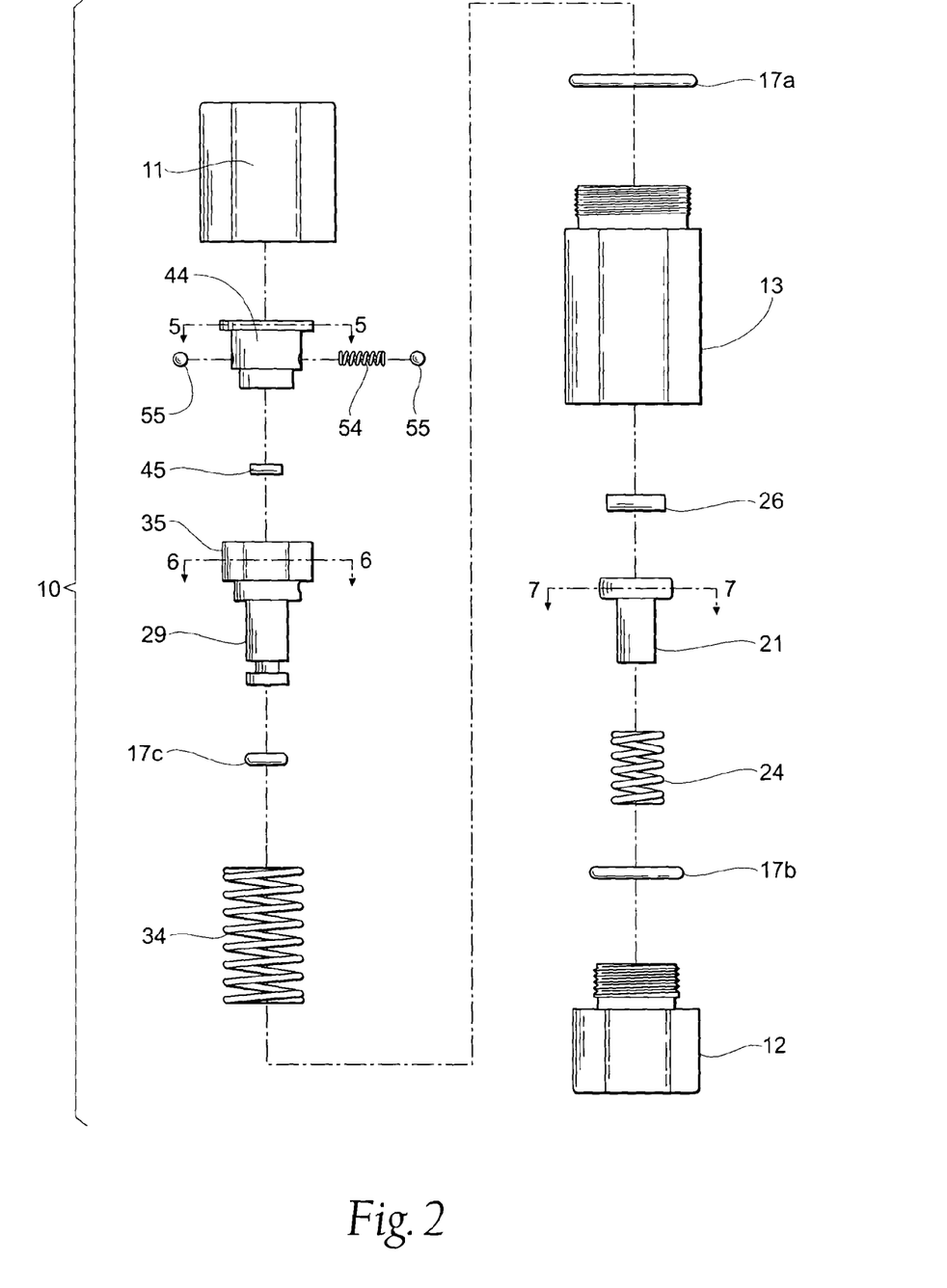
FIG. 2 is an exploded view of the embodiment depicted in FIG. 1.
Figure 3:
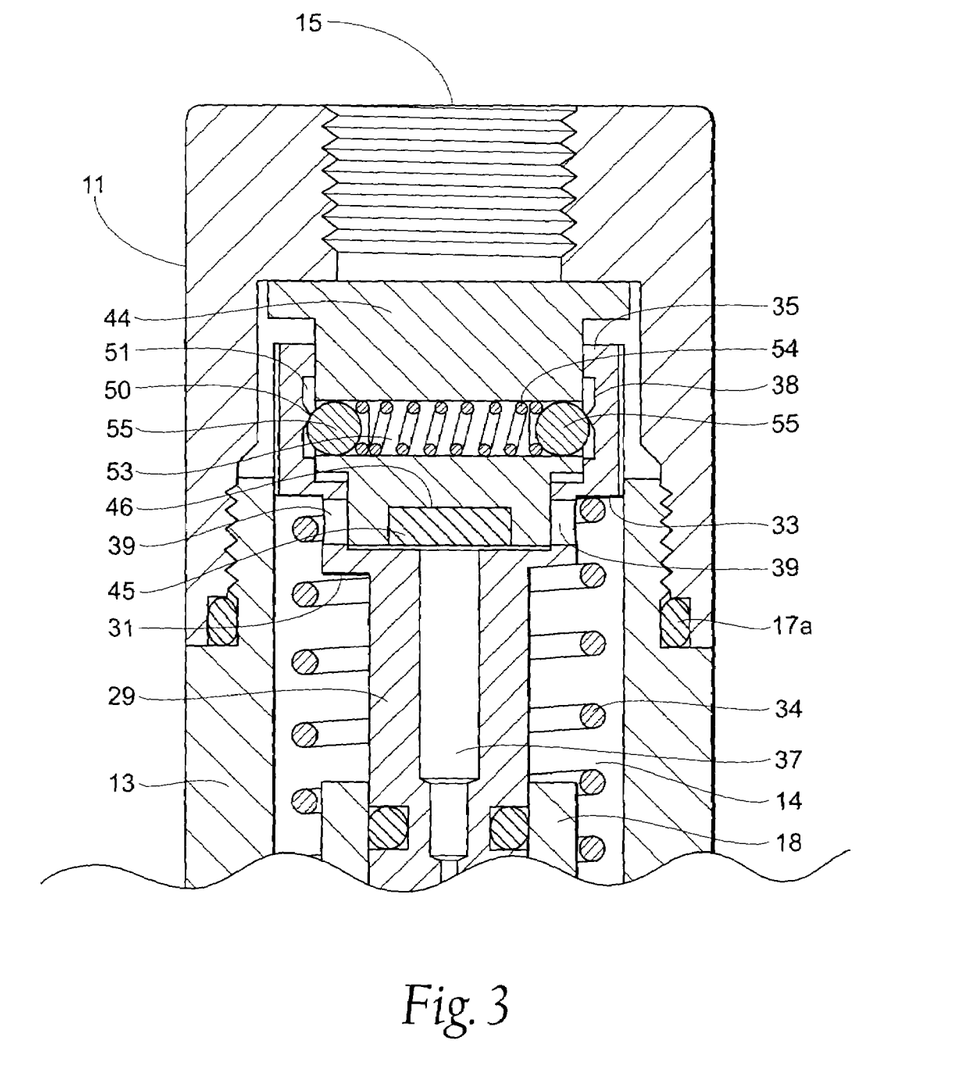
FIG. 3 is a fragmentary view of the upper end of the embodiment depicted in FIG. 1.

Referring to the drawings, wherein like numerals represent like parts throughout the views, there is generally designated at 10 a hydraulic metering device. Referring more specifically to FIGS. 1–3, inclusive, of the drawings, the hydraulic metering device 10 of this invention is intended to be disposed in a liquid medium supply line. A pump, not shown, delivers the liquid medium to the metering device 10 in pressure pulses for metered flow to a user assembly, also not shown.

Still referring to FIGS. 1–3, the hydraulic metering device 10 has three sections including a pair of opposed hollow cap fittings 11 and 12 and a main body 13, with the main body further comprising a cylindrical chamber 14. The hollow cap fittings 11 and 12 further comprise an inlet 15 and outlet 16, respectively. The inlet 15 and the outlet 16 each are adapted to communicate with a fitting such as a conventional pipe fitting. As shown in the drawings (see FIG. 1), the inlet 15 and outlet 16 may be axially aligned with the chamber 14 and to each other. A pair of o-rings, 17*a* and 17*b*, provide a liquid-tight seal between the cap fittings 11 and 12 and the main body 13.

The main body 13 includes a check valve 44, a piston 29 and an evacuation valve 21. The evacuation valve 21 acts as a type of check valve in the present invention. However, for clarity of presentation the evacuation valve 21 and the check valve 44 are described in the specification and represented in the drawings as distinct elements. The hydraulic metering device 10 has three springs. The springs are termed the piston return spring 34, the evacuation seal spring 24 and the detent spring or check valve spring 54. The check valve 44 toggles between a closed and open position. The evacuation valve 21 is opened by pressure of the liquid within the chamber ahead of the piston 29 and is held open by the piston crown to preclude the introduction of any air into the system.

A cylindrical sleeve 18, integral with body 13, is disposed in the chamber 14 generally adjacent to the outlet 16 and in axial alignment with the chamber 14. The end of the sleeve 18 adjacent to the outlet 16 is tapered to provide a peripheral edge 20 that projects forwardly in the direction of the outlet 16 at the inside diameter of the sleeve 18.

Figure 7:
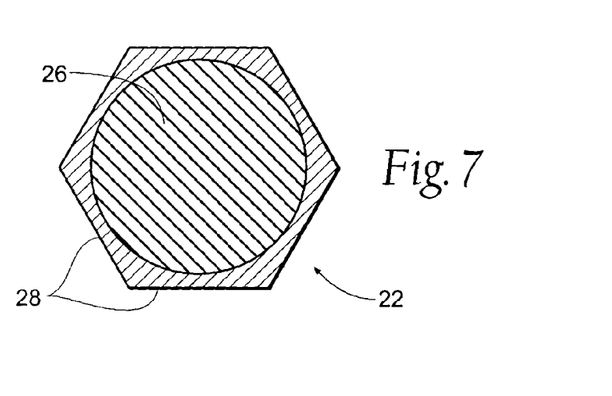
FIG. 7 is an overhead, cross-sectional view of a third valve used in the present invention presented along line 7—7 of FIG. 2.

At the peripheral sleeve edge 20, an evacuation valve member 21 provides closure for the end of the sleeve 18. The evacuation valve member 21 comprises a carrier 22 that is axially slidable in the decreased diameter portion 23 of chamber 14 and is biased to the sleeve closure position shown in FIG. 1 by the evacuation seal spring 24 extending between the shoulder 25 adjacent to the outlet 16 and the shoulder 19 of a carrier 22. Facing the sleeve 18 and generally centrally thereof, the carrier 22 is provided with a cylindrical resilient sealing block 26. The sealing block 26 is seated in a carrier recess 27 and is engaged upon the sleeve edge 20 to effect closure of the sleeve end. The periphery of the carrier 22 is provided with one or more flats 28 as shown in FIG. 7, so that the interior of the cylinder sleeve 18 is placed in communication with the outlet 16 when the evacuation valve member 21 is open.

In an alternate embodiment, evacuation valve member 21 and sealing block 26 are integrally formed in a one-piece construction. The one-piece member may be formed from a plastic such as polypropylene or any other suitable material.

A piston 29 is operatively disposed within the cylindrical sleeve 18 and forms therewith the piston or metering chamber 30 as shown in FIG. 1 to be forward of the piston 29. Another o-ring seal 17c provides a liquid-tight seal about the periphery of the piston 29 (see FIG. 2). Externally the piston 29 is stepped, providing an annular shoulder 31 intermediate its length (see FIG. 3).

The exploded view of FIG. 2 further illustrates details of the metering device 10. As previously noted, the fittings 11 and 12 are threadingly engaged with the body 13, thereby forming an airtight device. The O-rings 17a and 17b also contribute to the airtight nature of the metering device 10. The elements of the fittings 11 and 12 may be arranged and secured separately to the body 13. For example, the evacuation valve 21 and the evacuation seal spring 24 may be removed from the body 13 without it being necessary to remove the piston 29, the check valve 44, or the piston return spring 34.

Figure 6:
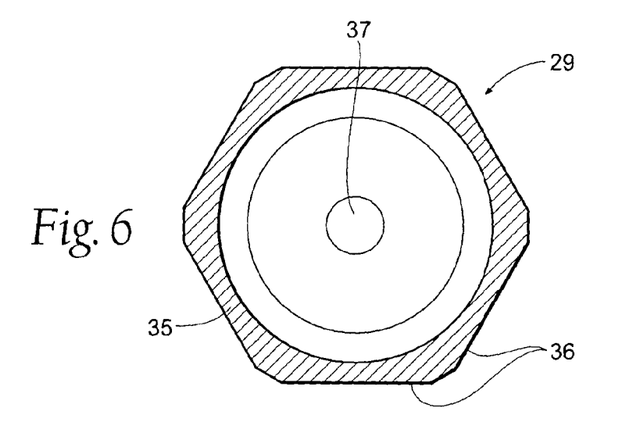
FIG. 6 is an overhead, cross-sectional view of a second valve used in the present invention presented along line 6—6 of FIG. 2.

Referring specifically to FIG. 3, a fragmentary view of the upper end of the metering device 10 is shown. Another annular shoulder 33 is adjacent to the rear end of the stepped piston 29. The annular shoulder 33 on the piston 29 provides an abutment for the piston return spring 34 disposed between the shoulder 33 and the shoulder 32 formed at the junction of sleeve 18 and chamber 14. The piston 29 has a drive end portion, which extends rearwardly from the shoulder 33 and is longitudinally slidable along the cylindrical wall of chamber 14. The chamber 14 is described as being cylindrical, but any solid-shaped chamber, such as hexagonal or octagonal, that allows the system to operate is allowable. In this sense, the use of a cylindrical chamber would encompass all such shaped chambers. As shown in FIG. 6, the piston drive end portion 35 is provided with one or more flats 36 so that pressure will be equalized on opposite sides of the piston portion.

The forward face of the check valve assembly 44 carries a resilient cylindrical sealing block 45 that is seated in the recess 46 (see FIGS. 2 and 3). The sealing block 45 is selectively engageable with the entry to a passageway or through bore 37 of the metering piston 29 to selectively close the through bore 37. A pair of passageways 39 is formed above shoulder 31 thereby permitting liquid communication between inner cavity 38 and chamber 14.

In an alternate embodiment, resilient cylindrical sealing block 45 is replaced with a spherical ball. A mating cylindrical seat is formed in the entry to through bore 37. While any suitable material could be used, in the preferred alternate embodiment, the spherical ball is stainless steel. Its preferred diameter is 1/8 inch and is designed to protrude 1/32 inch from the check valve 44.

The piston drive end portion 35 defines an inner cavity 38 (see FIGS. 1 and 3) in which the check valve assembly 44 is seated. The forward face of the check valve assembly 44 carries the projecting resilient cylindrical sealing block 45 mounted in the valve member recess 46. The sealing block 45 is in alignment with and engageable with the passageway 37. Within inner cavity 38, an annular detent 50 is formed about its inner periphery 51. The check valve 44 includes a diametrically disposed passageway 53 extending there through. Detent spring 54 is positioned within the passageway 53. A pair of detent ball members 55 is biased outwardly by the spring 54. The outward pressure exerted upon the ball members 55, in conjunction with the location of the annular detent 50, defines two distinct positions for the check valve 44: open and closed. FIGS. 1 and 3 depict the valve 44 in the closed position.

Figure 4:
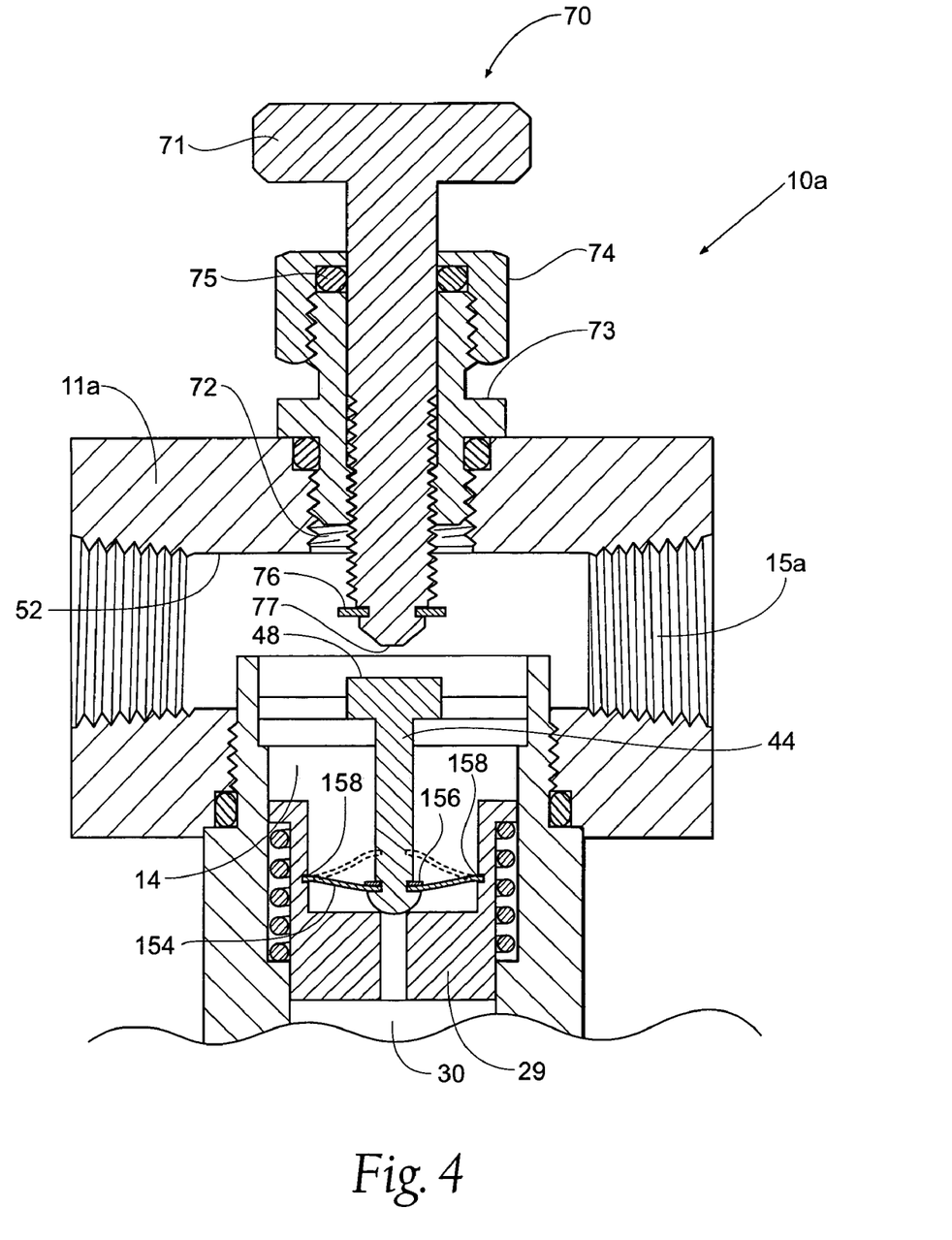
FIG. 4 is a fragmentary view of the upper end of a second embodiment of the present invention.
Figure 14:
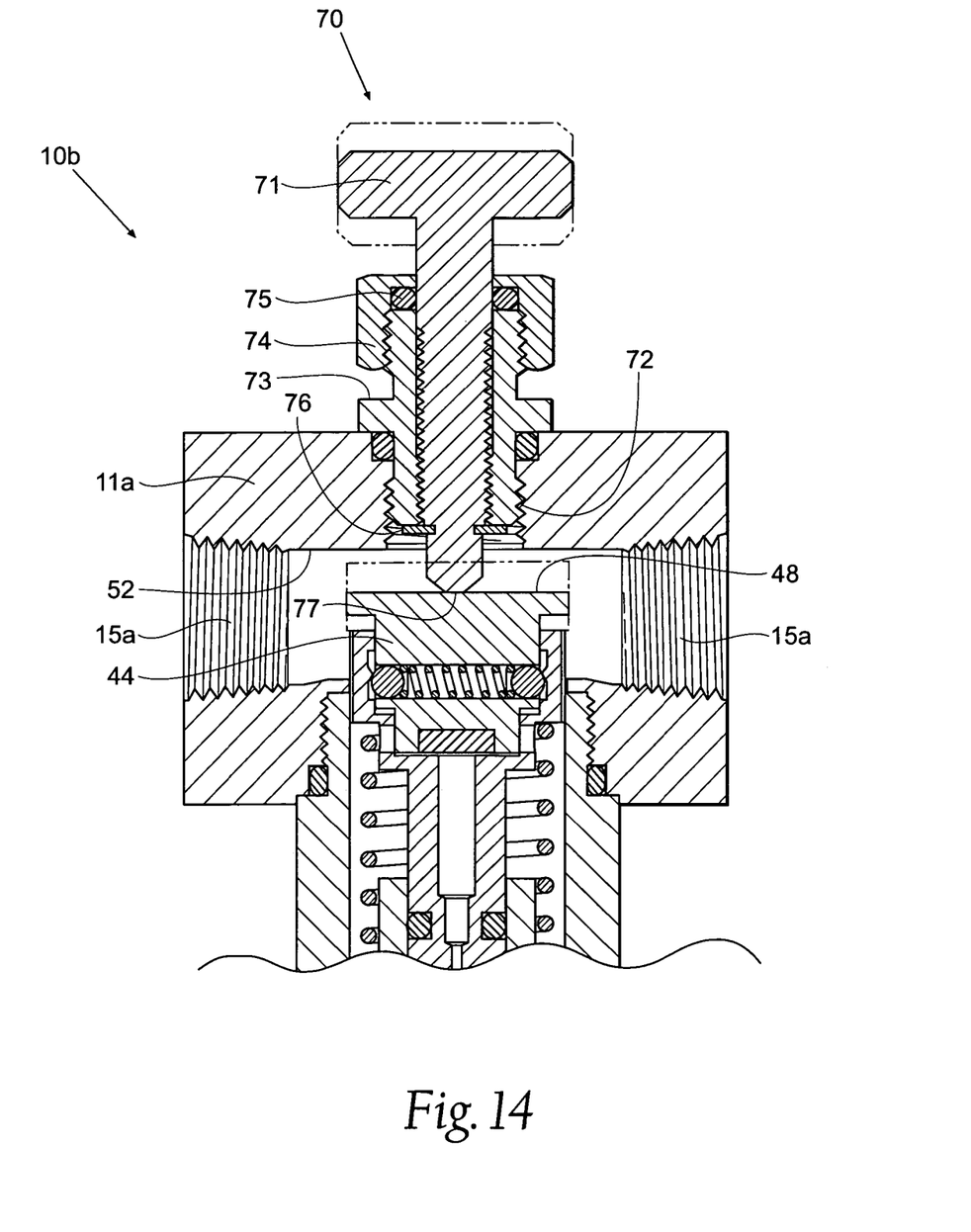
FIG. 14 is a fragmentary cut-away side view of a third embodiment of the present invention.

In a second embodiment 10a shown in FIG. 4 and a third embodiment shown in FIG. 14, an adjustment device 70, such as a set screw or thumb screw 71, is disposed in a threaded inlet aperture 72 generally central of an inlet 15a in an alternate cap fitting 11a. As shown in the Figures the inlet 15a may be perpendicular to the piston 29 and the chamber 30. In the alternate embodiments 10a, 10b, an adjustment stem adapter 73, including a packing nut 74 and o-ring 75, is provided to form a liquid-tight seal about the screw 71 and threaded aperture 72. A retaining clip 76 may also be provided near screw end 77 to prevent the accidental removal of the screw 71. When the screw 71 is fully retracted from the chamber 14, the upper surface 48 of check valve member 44 will have the capability of being biased against the screw end 77 to provide for a piston chamber 30 of maximum length for maximum feeding of liquid medium with each working stroke of the piston 29. As the set screw 71 is turned to project inwardly from the wall 52, the piston chamber 30 will be correspondingly shortened and provide for corresponding feeding of liquid medium with each piston stroke. The amount of feeding is not only controlled by the size of the piston chamber 30, but also by the pulsing rate of the pump, not shown.

In the alternate embodiment 10a shown in FIG. 4, the detent spring 54 and the detent ball members 55 of the first embodiment are replaced with diametrically opposed leaf spring or leaf springs 154. The leaf spring 154 may be centrally located with respect to the check valve member 44 and the piston chamber 30. The leaf spring 154 is secured to the check valve assembly 44 by a snap ring 156. The ends of the leaf spring 154 located away from the center of the check valve member 44 are nestled into detents 158 located in the piston 29, which limit the range of motion of the check valve member 44. Thus, the leaf spring 154 has a shape and angle that permits the check valve member 44 to move between a fully closed position and a fully opened position (shown in phantom).

Figure 5:
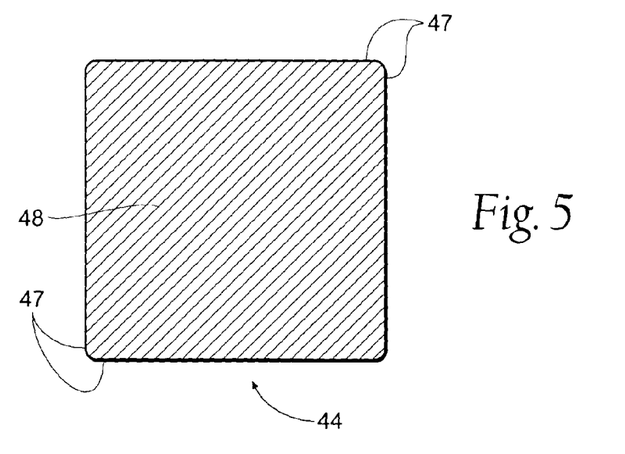
FIG. 5 is an overhead, cross-sectional view of a valve used in the present invention presented along line 5—5 of FIG. 2.

As shown in FIG. 5, the upper surface 48 of the check valve member 44 is provided with one or more flats 47 to provide for the passage of liquid medium around the valve member. FIG. 6 shows the upper surface of the drive end portion 35 of the piston 29 with flats 36. The flats 36 also contribute to an even flow of liquid through the bore 37. When the check valve member 44 is nested within the piston 29 (see FIG. 2), the flats 44 are not aligned with the flats 36. Such an arrangement allows liquid flow to continue past the check valve member 44 through the bore 37. FIG. 7 shows the upper surface of the carrier 22 with flats 28 and having sealing block 26 centrally located within the carrier 22. Carrier 22 also assists in an even liquid flow through the metering device. The utility of these devices will become more evident as hereinafter further described with reference to FIGS. 8–13.

Operation

Figure 8:
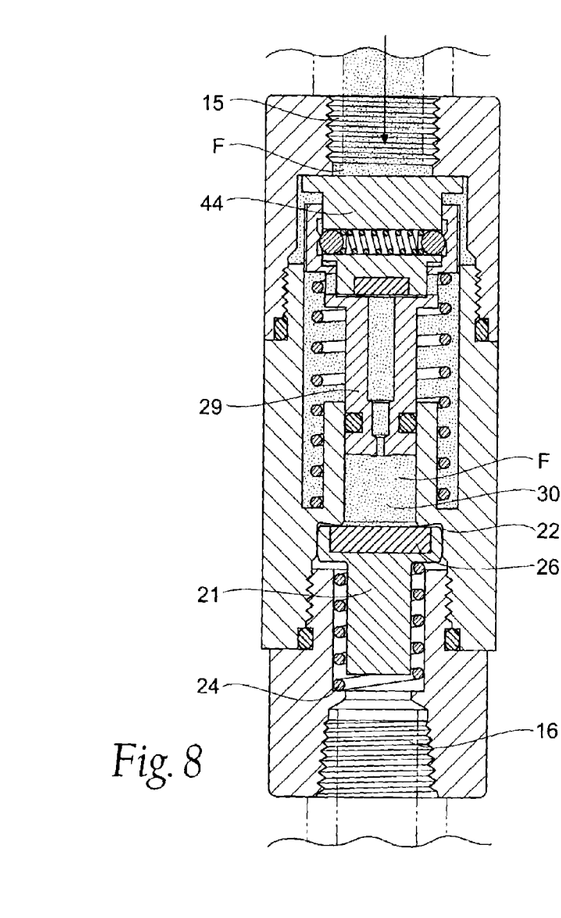
FIGS. 8–13 show the flow of a liquid being regulated by the present monitoring device.

The operation of the FIG. 1 embodiment of the metering device 10 is shown in FIGS. 8–13, inclusive. The general steps of the device are as follows:

Position 1: The check valve 44 is closed, no pressure is coming from the pump (not shown), and the metering chamber 30 is full of liquid. (FIG. 8)

Figure 9:
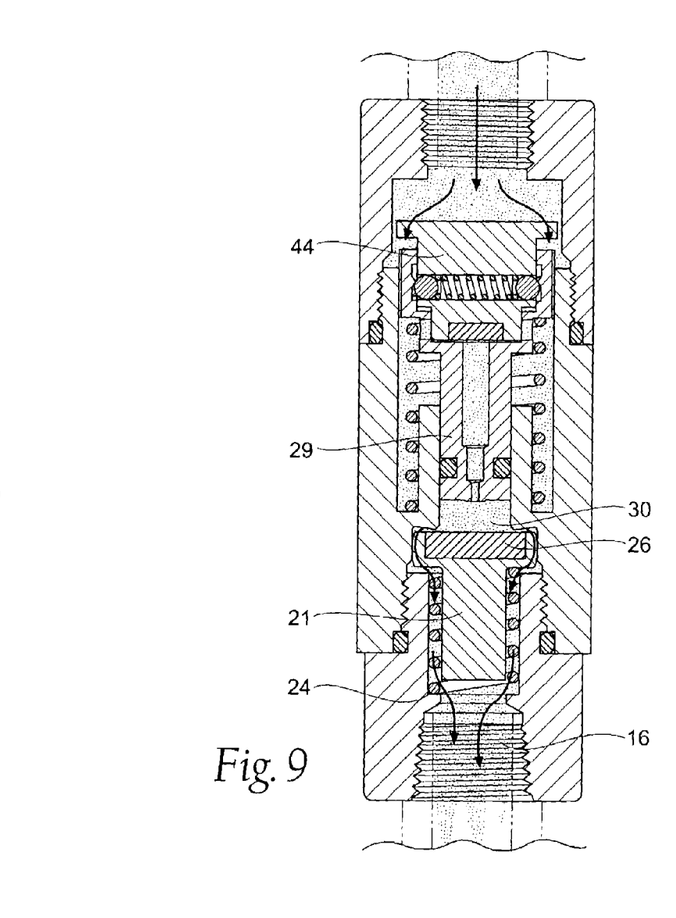
Figure 10:
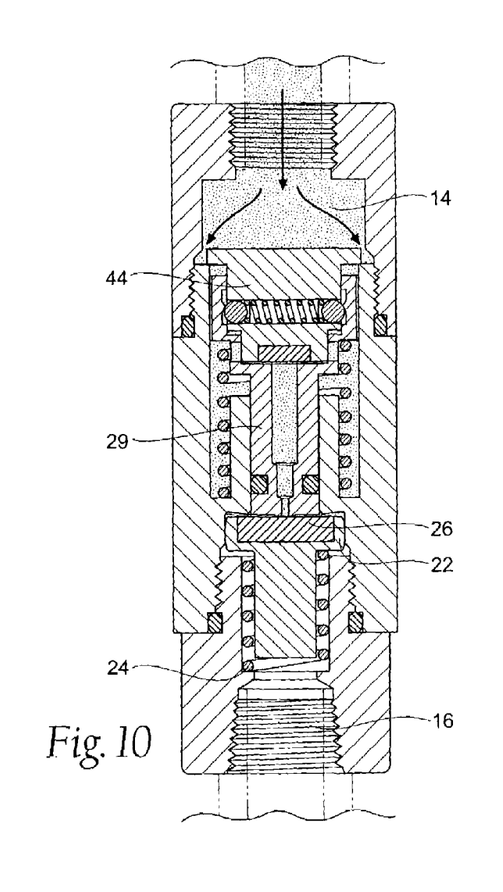

Position 2: The check valve 44 is still closed; there is now pressure from the pump forcing the piston 29 downward and onto the sealing block 26. The downward pressure is greater than the resilience of the evacuation seal spring 24, and sealing block 26 unseats and liquid flows past the sealing block 26. (FIGS. 9 and 10)

Figure 11:
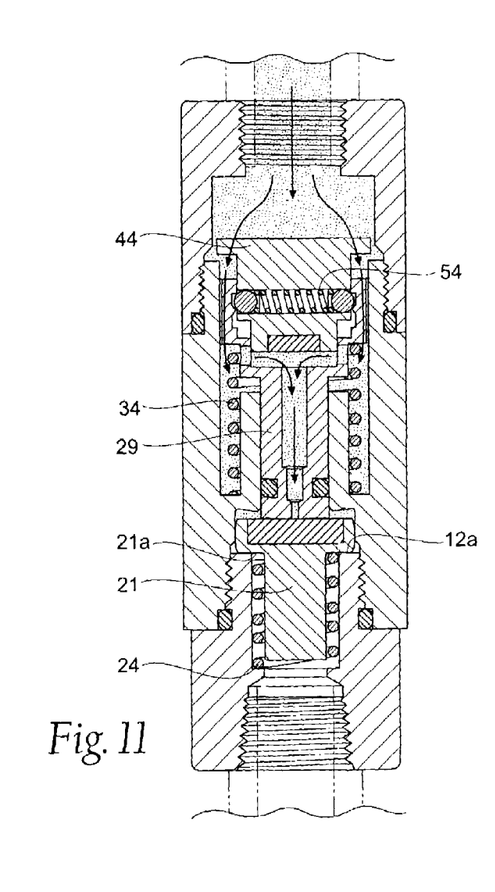

Position 3: The bottom of the piston 29 continues to press down on the sealing block 26 allowing the purge function to occur. The spring force of the piston return spring 34 overcomes the force of the check valve spring 54 and the check valve 44 snaps open. (FIG. 11)

Figure 12:
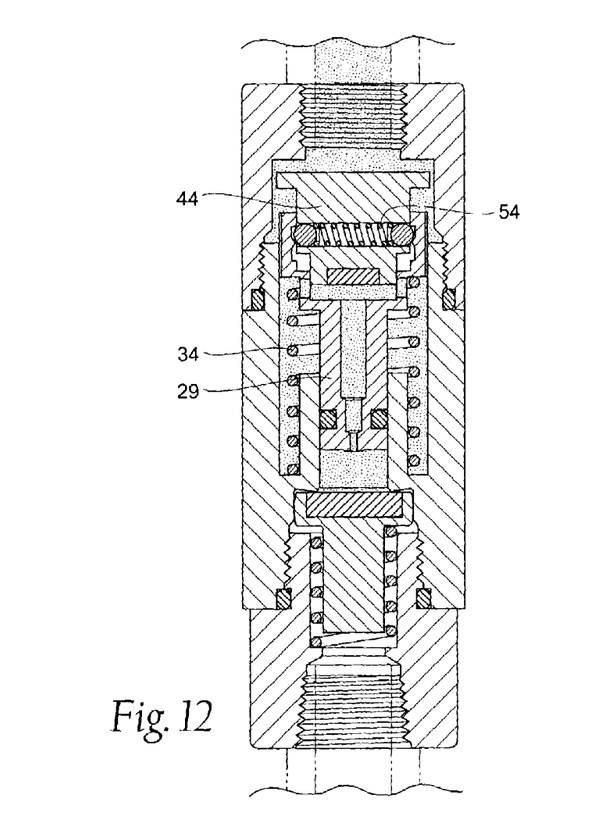
Figure 13:
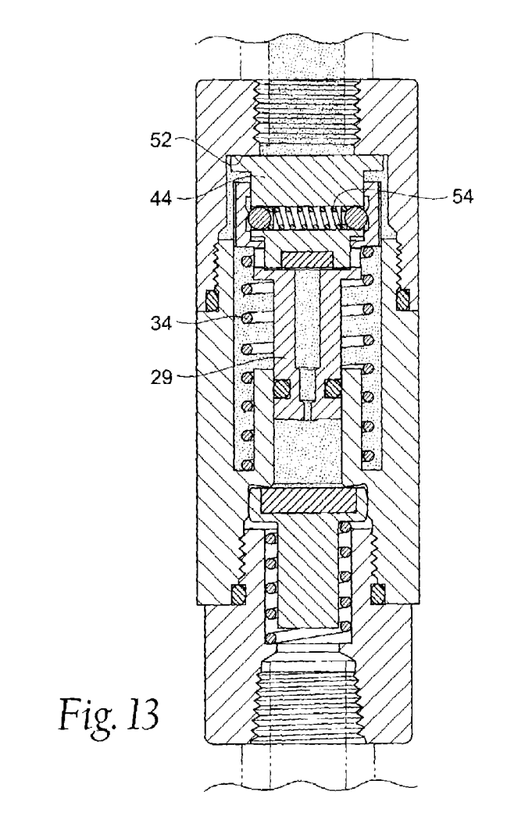

Position 4: Once the pressure bleeds off, the piston 29 retracts and the sealing block 26 reseats. The metering chamber 30 refills at top of stroke, and the check valve spring 54 snaps the check valve 44 closed. (FIGS. 12 and 13).

Detailed Operation

A liquid pressure pulse from a hydraulic pump, not shown, initiates a power or working stroke of the piston 29, as detailed in FIG. 8. During the working stroke, initially the piston 29 and the check valve 44 in its closed, forwardly projecting position move together as a unit. Liquid enters through the inlet 15. When the pressure in the piston chamber 30 exceeds the biasing force of the evacuation seal spring 24, the evacuation valve member 21 opens to allow the liquid medium content in the piston chamber 30 to escape toward and through the outlet 16 (See FIG. 9).

Toward the end of the working stroke of the piston 29, the lowermost surface of the piston 29 engages with the upper surface of the evacuation sealing block 26 thereby further biasing carrier 22 and spring 24 (see FIG. 10). At the end of the working stroke of the piston 29, the check valve 44 remains closed, as generally shown in FIG. 10, such that the valve is not permitted to expose or open the check valve 44 to the liquid medium in the chamber 14 behind the piston 29.

As shown in FIG. 11, at the termination of the pressure pulse, the evacuation valve 21 is biased to closure again by the evacuation seal spring 24 as the piston 29 commences its return stroke in response to the lower surface of shoulder 21a of the evacuation valve 21 shouldering on the upper surface 12a of the outlet cap fitting 12. Simultaneously, the combined forces from the shouldering, detent spring 54 and piston return spring 34 cause the check valve 44 to move from its closed position to its open position. (See FIG. 12). At the conclusion of the return stroke of piston 29, travel of the check valve 44 is interrupted by engagement of the valve 44 with the end wall 52 (FIG. 13) or adjusting screw 71 (FIG. 14). At this point, the check valve 44 snaps closed. The piston 29 meanwhile continues aftward to its initial position. The metering device 10 is then ready for the next cycle of operation.

The use of the adjusting screw 71, as shown in FIG. 14, allows an operator to increase or decrease the volume of liquid media delivered by the device 10b. The screw 71 may be adjusted to heights that may differ by only a few mils. Such a precise adjustment is advantageous in lubrication systems, where only a few drops of lubricating liquid are necessary for lubrication.

A preferred embodiment of the above process is next discussed in more detail and with reference to FIGS. 8–13, inclusive. When the piston return spring 34 is fully compressed it exerts a force of 4.89 pounds. Using standard spring manufacturing tolerances of +/−10%, the force could range from 4.40 to 5.38 pounds. The purpose of this spring 34 is to return the piston 29 to top dead center (TDC) (either end wall 52 or screw end 77) after the metering device 10 has dispensed a predetermined amount of liquid. The geometry of the assembly requires 90 to 110 psi of inlet pressure to compress the spring 34.

When the evacuation seal spring 24 is fully compressed in the assembly, it exerts a force of 6.53 pounds. Using standard spring manufacturing tolerances of +/−10%, the force could range from 5.88 to 7.18 pounds. The purpose of this spring 24 is to create a biasing mechanism for the evacuation seal 26. The geometry of the assembly requires 120 to 147 psi of inlet pressure to compress the spring 24.

When the check valve spring 54 is fully compressed in the assembly, it exerts a force of 1.90 pounds. Using standard spring manufacturing tolerances of +/−10%, the force could range from 1.71 to 2.09 pounds. The purpose of this spring 54 is to exert a force on the balls 55 that create the biasing mechanism on the check valve 44. The geometry of the assembly requires 35 to 43 psi (pounds per square inch) of inlet pressure to compress the spring 54. It is to be understood that while a compression spring is the preferred spring for the check valve, a leaf spring 154 could also be utilized, as described above with reference to FIG. 4.

The preferred embodiment requires approximately 210–270 psi of fluid pressure to get the piston 29 to initiate movement. Approximately 210–257 psi is the sum of the pressure to overcome the force of the piston return spring 34 and the evacuation seal spring 24. The device requires approximately 245–300 psi of pressure to get the check valve 44 to ride over the critical pressure point, with 245–300 psi being the sum of the piston return spring 34, evacuation seal spring 24 and check valve spring 54. The preferred embodiment requires 210–257 psi to shoulder the piston 29 against the positive stop at bottom dead center (BDC). Pressure from the supply pump continues to increase to the predetermined system bypass pressure. When the supply pressure is shut off, the system begins to bleed off. The piston 29 stays at BDC until the supply pressure bleeds off to 210–257 psi.

As the pressure continues to bleed off, the evacuation seal 26 and piston 29 return at the same rate until the evacuation seal 26 contacts the sleeve edge 20. Once contact is made with the sleeve edge 20, the piston 29 and evacuation seal 26 stop. The evacuation seal 26 stops because it is shouldered against the sleeve edge 20. The piston 29 stops until the pressure bleeds off to 90–110 psi at which point the piston return spring 34 continues to move the piston 29 toward top dead center (TDC) (either end wall 52 or screw end 77).

Once the piston 29 breaks away from the evacuation seal 26, the remaining upstream pressure is introduced into the pump chamber. At this point, the pressure is acting on the evacuation seal 26, which is biased by the evacuation seal spring 24. The evacuation seal spring 24 force must be enough to keep the seal 26 closed. If not, the upstream liquid could leak through and allow a secondary surge of lubricant to be dispensed from the metering device 10.

As the piston 29 approaches TDC, the check valve 44 contacts its stop 52. At this point, the piston return spring 34 must have a spring force high enough to overcome the 1.90 pounds from the check valve spring 54 and move the check valve 44 over the critical pressure point and ready to meter for its next cycle.

The above spring values do not have to be exactly as explained above for the device to operate. The values may be increased or decreased proportionately depending upon the purpose of the meter. However, two very important features with any spring combination must be designed accordingly. First, the evacuation seal spring must have a higher spring force than that of the piston return spring. This prevents the secondary surge of liquid. Second, the piston return spring force as it approaches TDC must be greater than the check valve spring force. This insures that the check valve will move over the annular detent and ready the meter for its next cycle.

According to the several embodiments hereinbefore described, the invention provides for a more accurate metering device. Should any air get into a liquid medium supply system that includes the metering device of this invention, such air should create no problem. Since each working stroke of the piston 29 breaks the plane of the open end of the cylinder by a predetermined distance, the metering chamber 30 is completely voided or purged with each stroke leaving no air for entrapment to disturb the accuracy of the metering device. In a preferred embodiment, the predetermined distance is 0.0314 inches.

With the metering device of this invention, even minute quantities of liquid medium can be accurately metered. Various modes of carrying out the invention are contemplated as being within the scope of the following claims particularly pointing out and distinctly claiming the subject matter regarded as the invention.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A metering device for a liquid medium under pressure, the metering device comprising:
   a housing having an inlet and an outlet for said liquid medium, said housing including a first chamber having an open end communicating with said outlet;
   a first check valve means in said housing, said first check valve normally biased to close said open end of said first chamber;
   a first piston having a drive end, said first piston slidably received and operatively disposed in said first chamber, said first piston and said first chamber defining a metering chamber;
   means to conduct said liquid medium from said housing inlet to said metering chamber;
   a second check valve located in said housing, received and operatively disposed in said first piston drive end and moveable between and including at least a first position and a second position, whereby pressure from said liquid medium moves said second check valve; and
   said first piston forcing said liquid past said first check valve means to completely evacuate said metering chamber on each working stroke to thereby generally preclude entrapment of air in said metering chamber.

2. The metering device of claim 1 wherein said first check valve means includes a seal normally biased and in sealing engagement with said open end of said first chamber.

3. The metering device of claim 1 wherein said second check valve means comprises a spring biased toggle mechanism arranged to provide selective positioning of said second check valve means.

4. The metering device of claim 3 wherein said second check valve means further comprises:
   a diametrically disposed passageway including a detent;
   at least one detent ball member;
   a check valve spring, said check valve spring biasing said at least one detent ball member outwardly against detent to provide said selective positioning of said second check valve means.

5. The metering device of claim 3 wherein said second check valve comprises a leaf spring.

6. The metering device of claim 1 wherein said first piston extends a predetermined distance out of said cylindrical chamber to completely evacuate said metering chamber.

* * * * *